Figure 1:
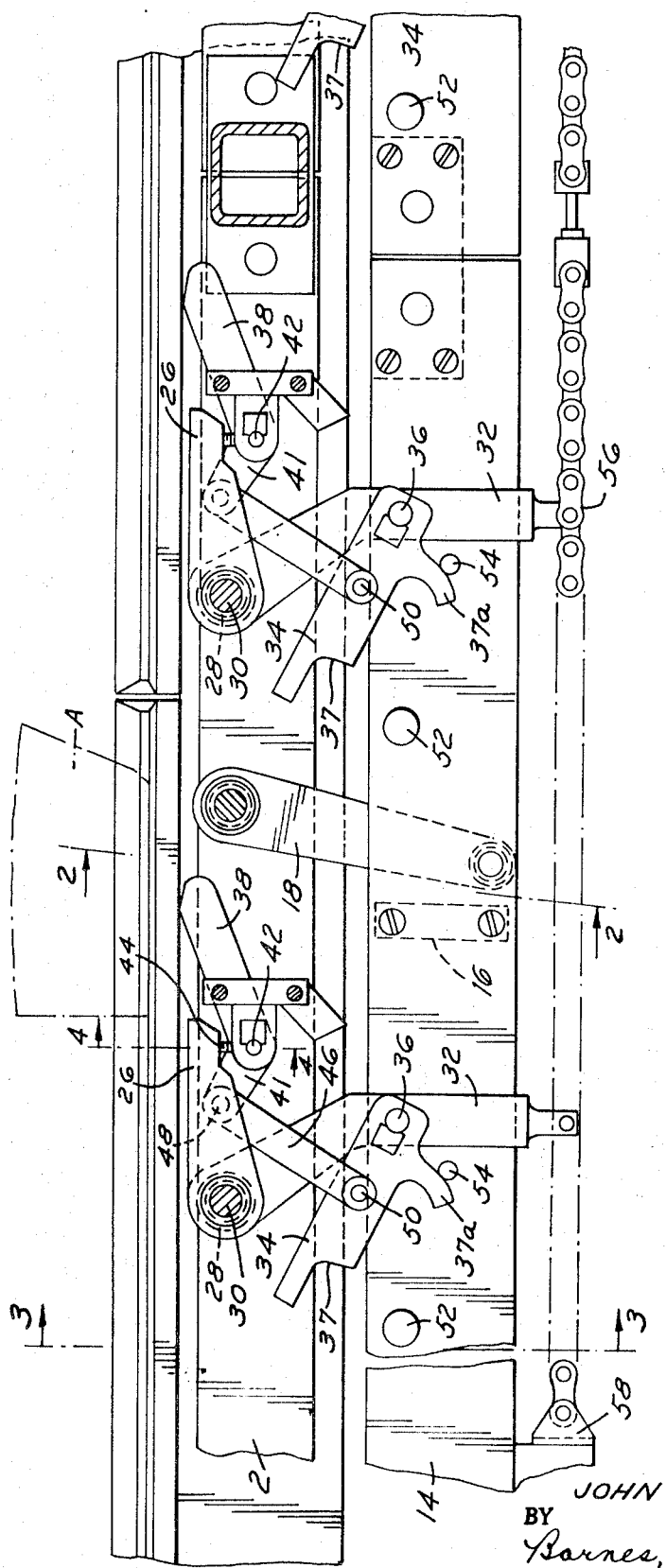

United States Patent [19]

Brems

[11] 3,747,741

[45] July 24, 1973

[54] ACCUMULATING CONVEYOR

[76] Inventor: John H. Brems, 32867 White Oaks Trl., Birmingham, Mich.

[22] Filed: July 19, 1971

[21] Appl. No.: 163,666

[52] U.S. Cl............................. 198/219, 198/221
[51] Int. Cl............................................ B65g 25/08
[58] Field of Search........................... 198/221, 219

[56] References Cited
UNITED STATES PATENTS

| 3,500,992 | 3/1970 | Tabor et al. | 198/219 |
| 3,527,338 | 9/1970 | Mita | 198/221 |
| 3,570,656 | 3/1971 | Manetta | 198/221 |

Primary Examiner—Evon C. Blunk
Assistant Examiner—Douglas D. Watts
Attorney—Barnes, Kisselle, Raisch & Choate

[57] ABSTRACT

An accumulating feed system utilizing a series of stations with sensor and control means at each station independent of work engaging means at each station, the control being such that an empty station signal at any one station will transmit directly to the work engaging means at each respective upstream station independently of the sensor and control means at such upstream stations and without affecting the work engaging means at each downstream station; and a work engaging means so constructed and actuated that it may serve to push workpieces along the path of travel or lift and carry the workpieces along such path or a combination of these functions at respective stations.

25 Claims, 19 Drawing Figures

Patented July 24, 1973

3,747,741

12 Sheets-Sheet 2

INVENTOR.
JOHN H. BREMS
BY
Barnes, Kisselle, Raisch & Choate
ATTORNEYS

Patented July 24, 1973

3,747,741

12 Sheets-Sheet 4

INVENTOR.
JOHN H. BREMS
BY
Barnes, Kisselle, Raisch & Choate
ATTORNEYS

Patented July 24, 1973

3,747,741

12 Sheets-Sheet 8

INVENTOR.
JOHN H. BEEMS
BY Barnes, Kisselle,
Raisch & Choate
ATTORNEYS

Patented July 24, 1973

3,747,741

12 Sheets-Sheet 10

INVENTOR.
JOHN H. BREMS
BY
Barnes, Kisselle, Raisch & Choate
ATTORNEYS 3,747,741

ACCUMULATING CONVEYOR

This invention relates to a multiple station transfer system.

It is an object of this invention to provide a transfer system which automatically fills all gaps in the line of workpieces being moved by the transfer system. This is accomplished by a mechanical system which senses any such gaps and thereby activates the transport mechanism upstream of any such gap thereby moving all workpieces upstream of the foremost gap one station forward on the next cycle of the system, until all workpieces on the transfer system fills all stations, sequentially starting from the most downstream station.

Reference is made to a U. S. Pat. No. 3,570,656, on an Accumulating Feed System issued to Peter J. Manetta on Mar. 16, 1971 as illustrative of the general type of system.

It is an object of the present invention to provide a system which positively controls the individual station transport means durng every portion of their cycle so they may not be disturbed or moved out of position through external influences.

It is a further object of this invention to provide individual station transport means which are interchangeably capable of transporting a workpiece from one station to the next by pushing it through dogs while it slides on stationary support rails, or, alternately, by lifting the workpiece free of the support rails and carrying it to the next downstream station.

It is a further object of this invention to provide a single transport system which is capable of sliding the workpieces on rails through a series of one or more stations along the system, and then carrying the same workpieces through another series of one or more stations, alternating between the "slide" and "carry" modes as often as required by external conditions.

It is a further object of this invention to provide a system in which any failure of gravity operated components to operate as intended due to friction or other causes will cause the system to fail-safe, i.e., the system would fail by not delivering parts even if called for, rather than attempting to deliver a second workpiece into an already occupied station, thereby causing workpiece-to-workpiece collisions and jamming.

It is a further object of this invention to control the action of a sensing means such that there is no relative motion between the sensing means and the workpieces. This is accomplished by advnacing the sensing means only durng a small fraction of the overall cycle when the transport system is nominally stationary with respect to the workpieces.

It is a further object of this invention to provide a system in which the transport member and sensing members are mounted on the same transfer means, rather than having the sensing means mounted on the frame. This minimizes the effect of registry errors and results in a very simple mechanical assembly.

It is a further object of this invention to deliver on demand a workpiece from the most downstream station to the next station, even though that next station is not a part of the transfer system, whenever said next station is emptied by other means.

It is another object of the invention to provide a control means for each station, so connected that a signal at one station reflects to upstream stations independently of the sensing and control means at the upstreat stations.

Other objects and features of the invention relating to details of construction and operation will be apparent in the following description and claims in which the principles of operation and use of the invention are set forth in connection with the best mode presently contemplated for practice of the invention.

DRAWINGS accompany the disclosure and the various views thereof may be briefly described as follows:

FIG. 1, a longitudinal section through conveyor.

Figure 2:
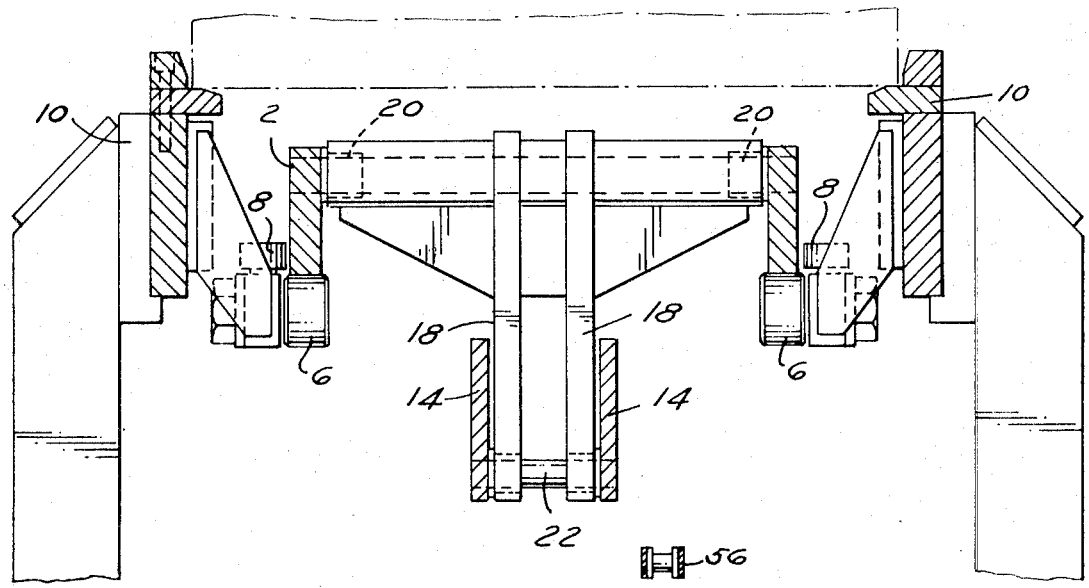

FIG. 2, a transverse section through conveyor on line 2—2 of FIG. 1.

Figure 3:
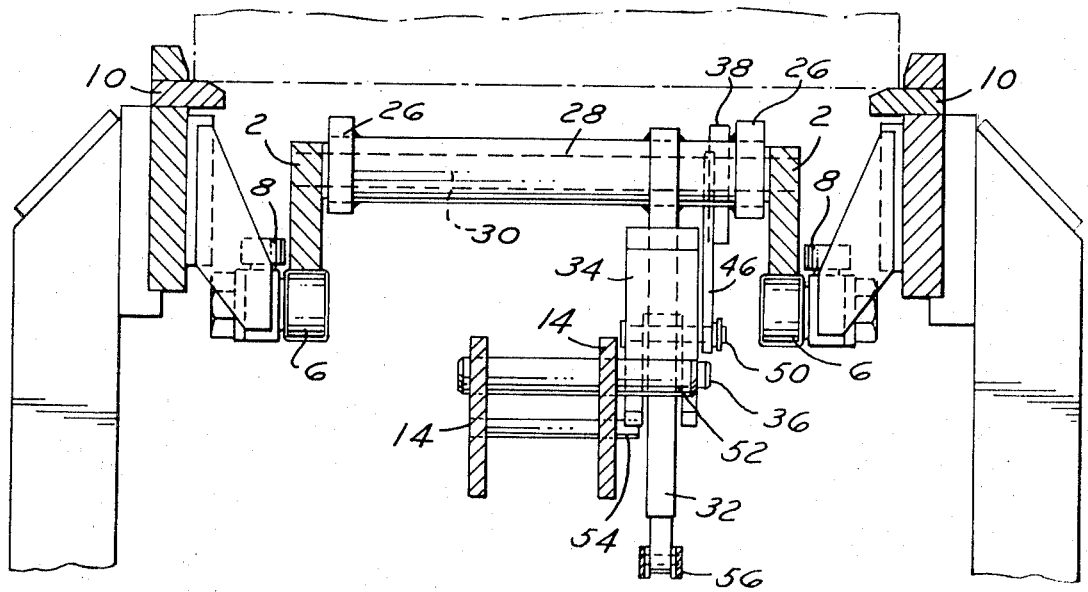

FIG. 3, a transverse section through conveyor on line 3—3 of FIG. 1.

Figure 4:
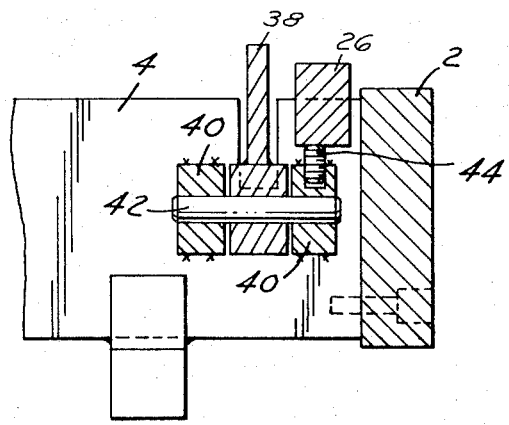

FIG. 4, a sectional view on line 4—4 of FIG. 1.

Figure 5:
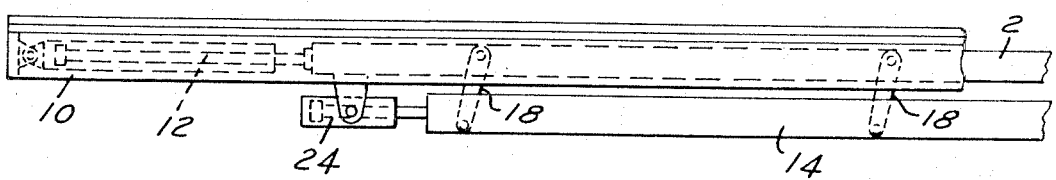

FIG. 5, a view of one end of the conveyor showing the power drive.

Figure 6:
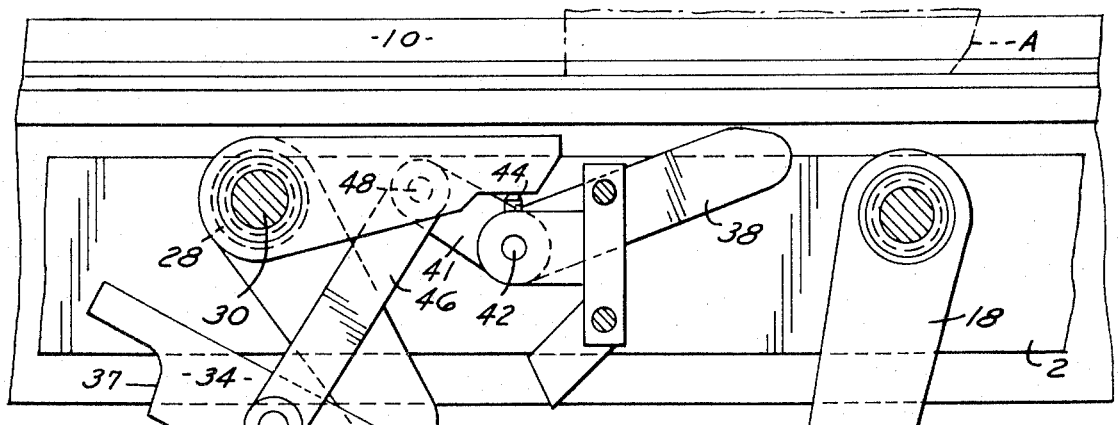

FIG. 6, a side view of the mechanism at the start of a cycle.

Figure 7:
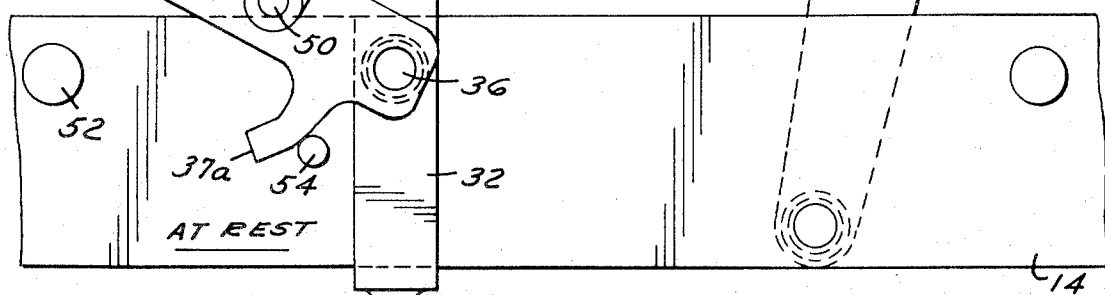

FIG. 7, a side view of the mechanism shortly after start of power bar movement.

Figure 8:
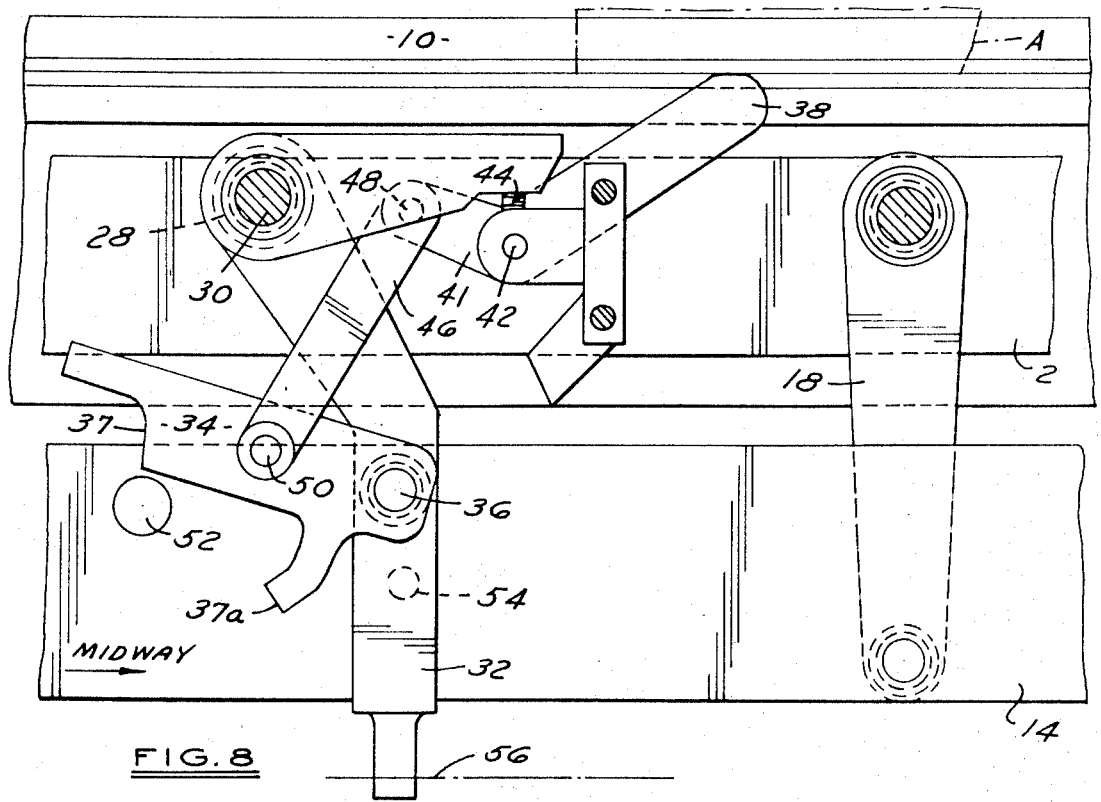

FIG. 8, a side view of the mechanism near midstroke of power bar movement, station occupied, all downstream stations occupied.

Figure 9:
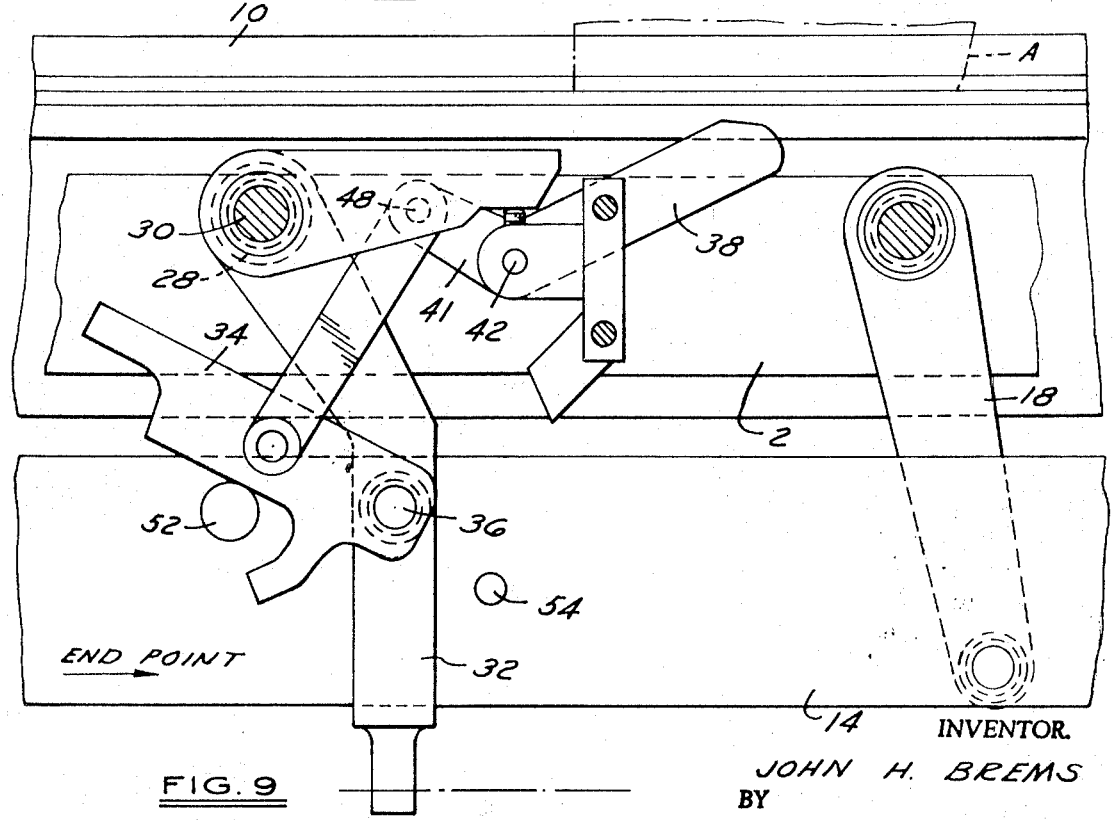

FIG. 9, a side view of the mechanism at end of power bar movement, station occupied, all downstream stations occupied.

Figure 10:
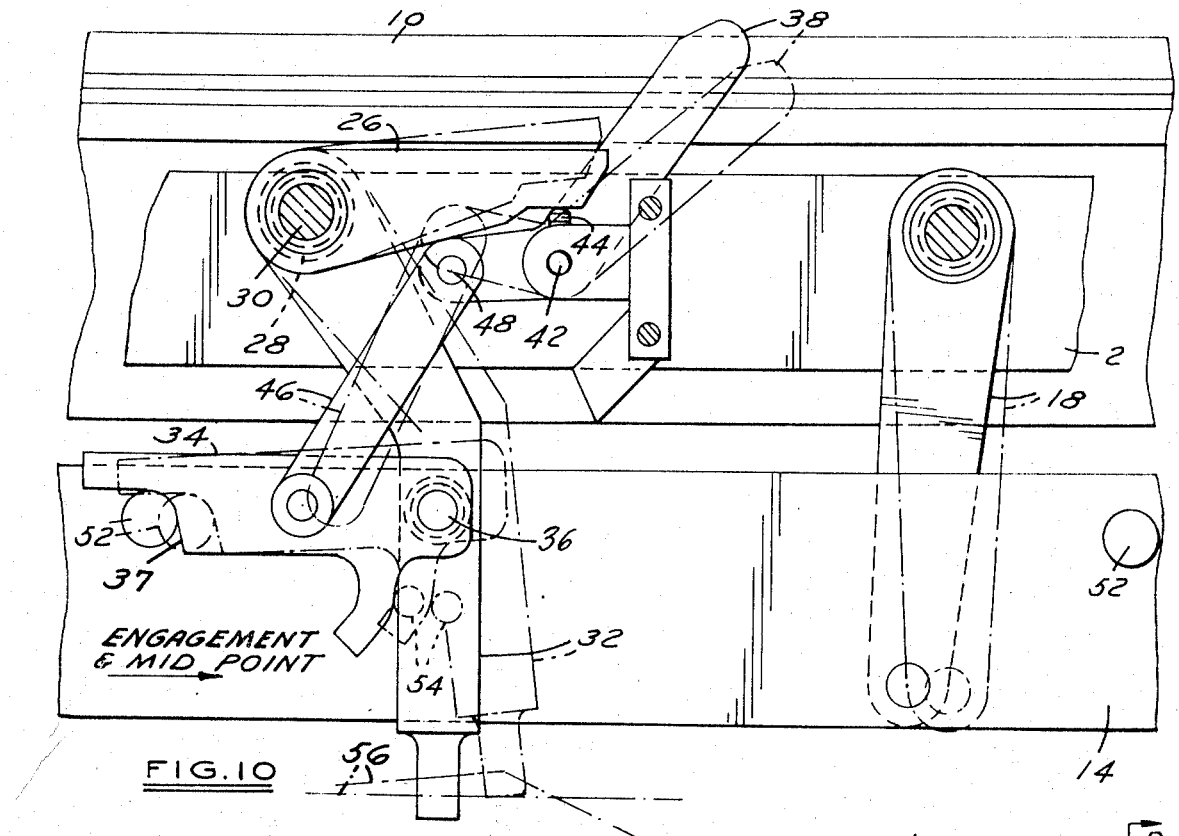

FIG. 10, a side view of the mechanism near midstroke of power bar movement, station empty, all downstream stations occupied.

Figure 11:
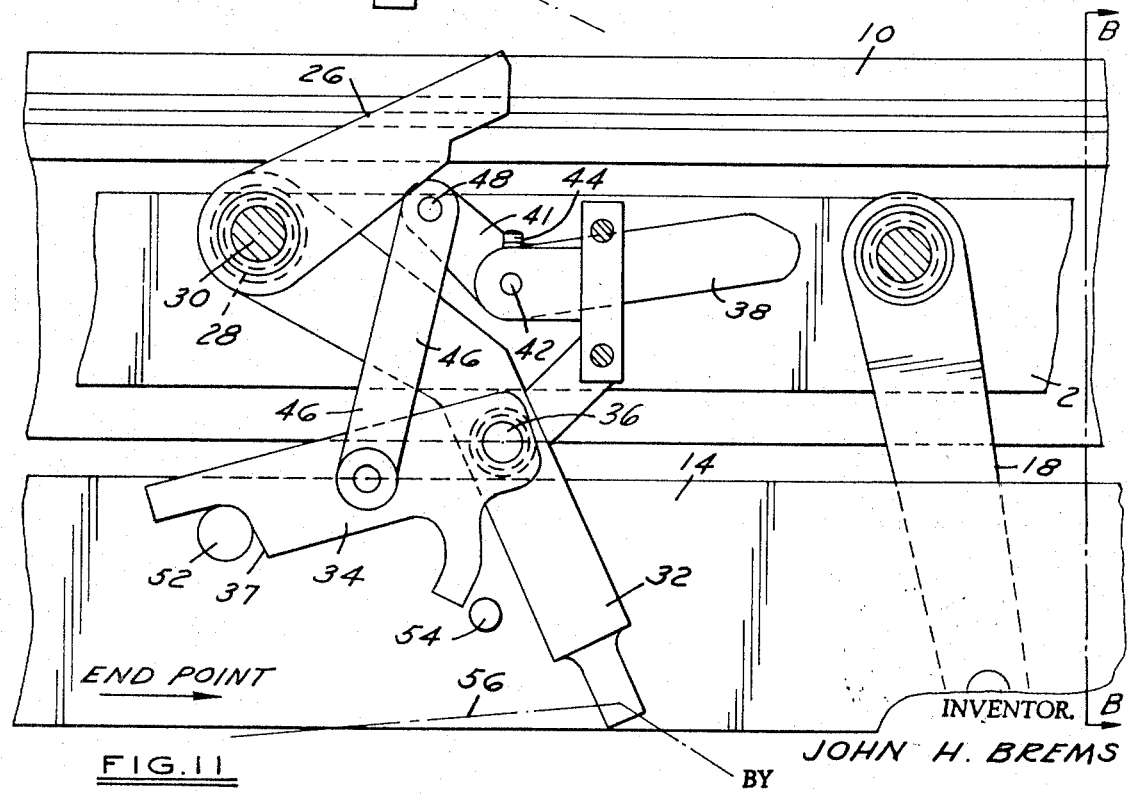

FIG. 11, a side view of mechanism at end of power bar movement, station empty, all downstream stations occupied.

Figure 12:
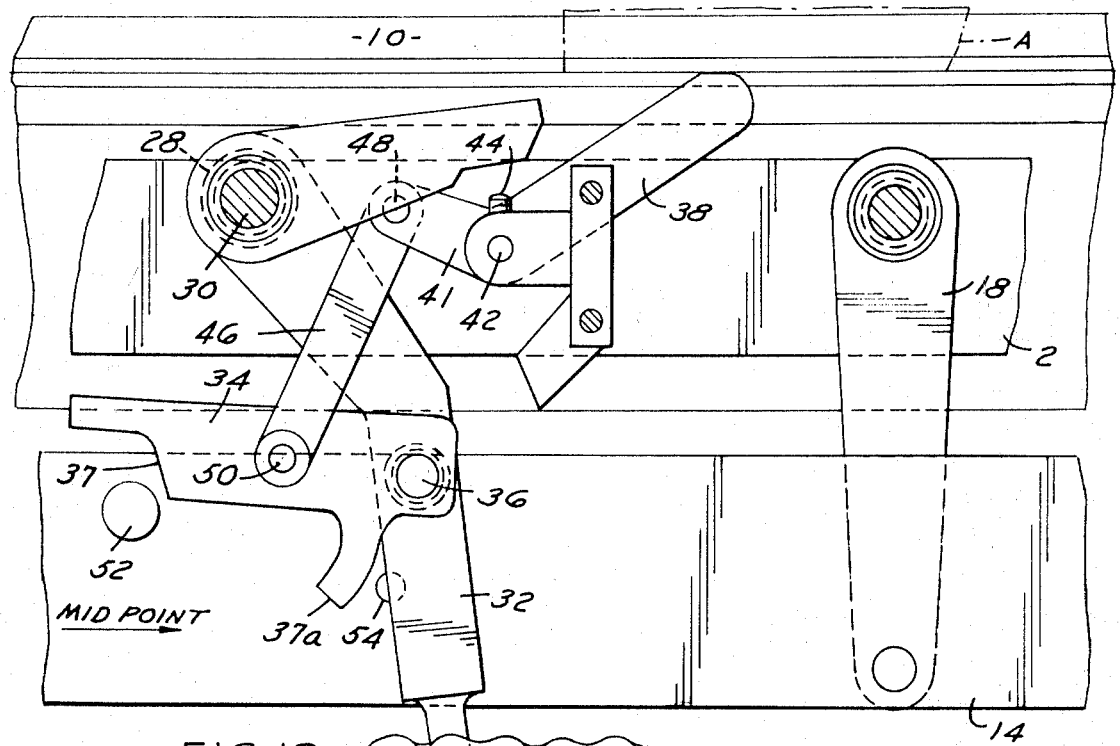

FIG. 12, a side view of mechanism near midstroke of power bar movement, station occupied, one or more downstream stations empty.

Figure 13:
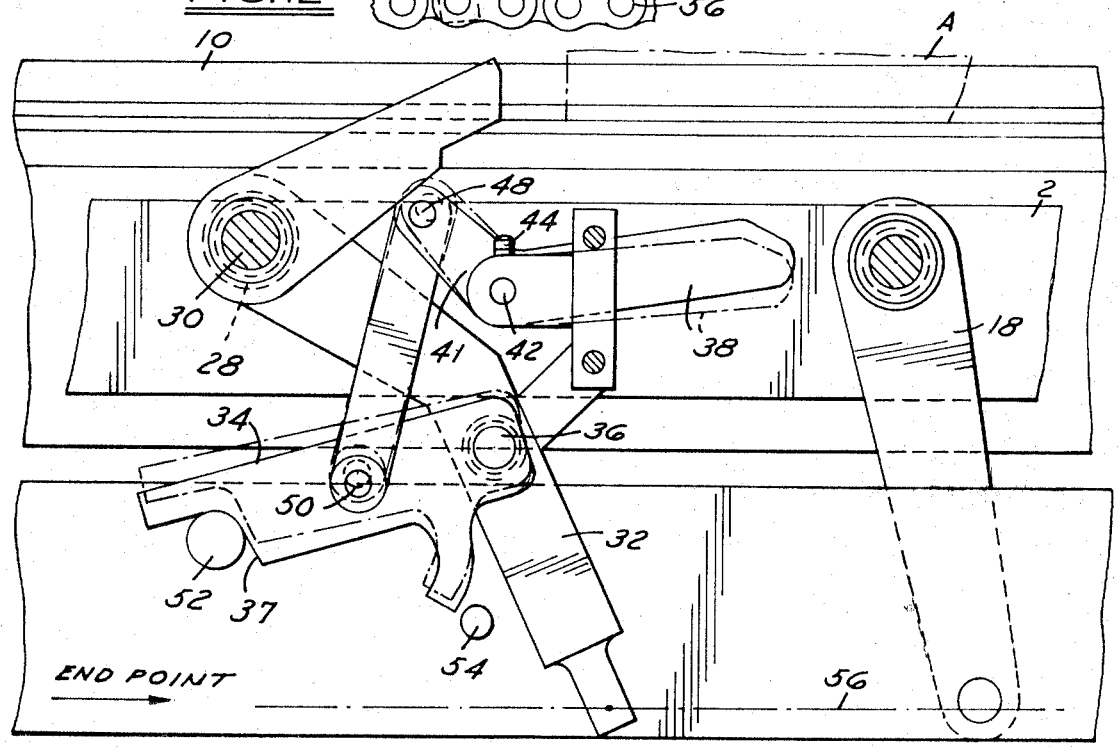

FIG. 13, a side view of mechanism at end of power bar movement, station occupied, one or more downstream stations empty.

Figure 14:
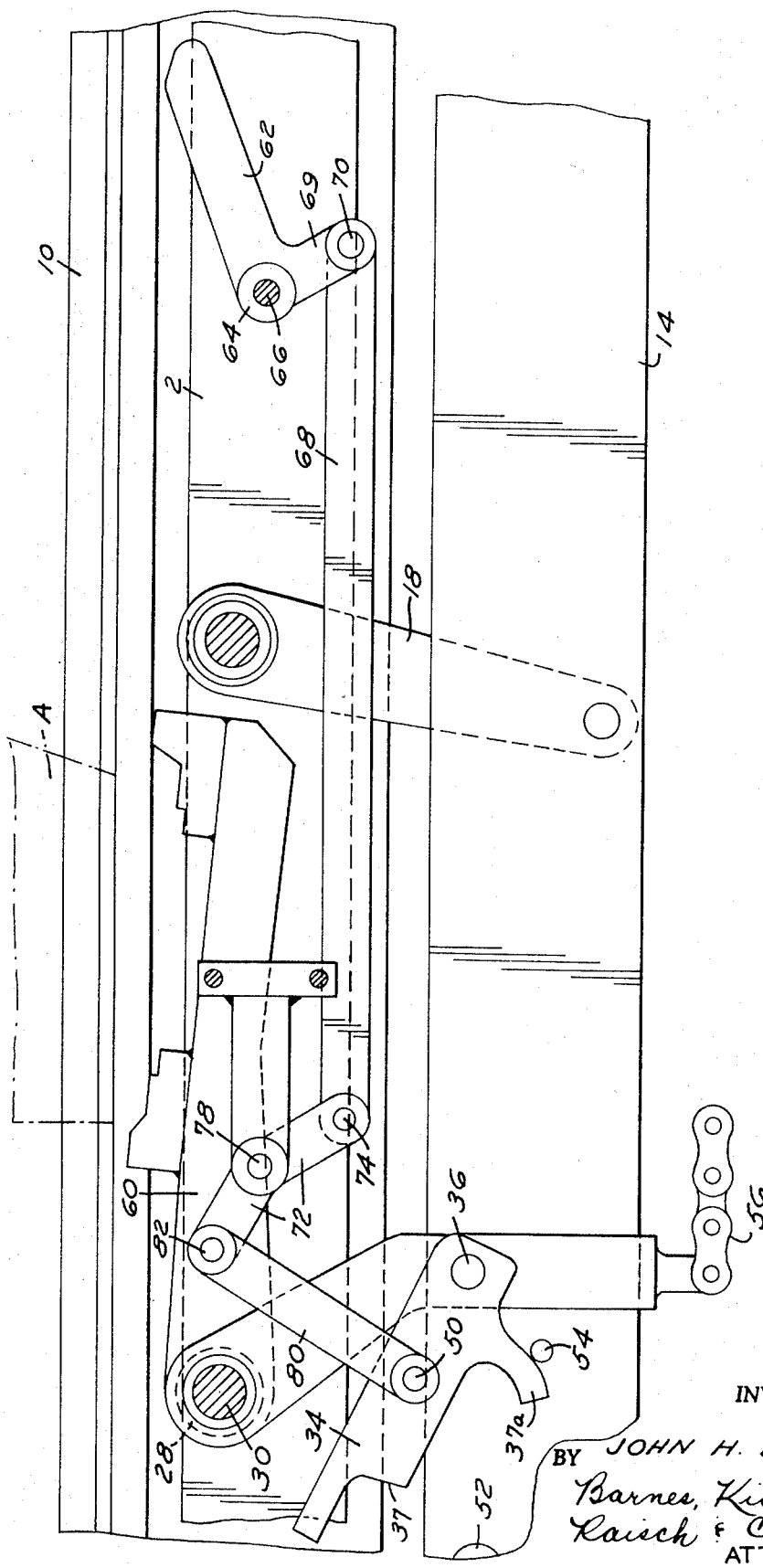

FIG. 14, a side view of mechanism with lifter arms attached to pusher dogs, at start of cycle.

Figure 15:
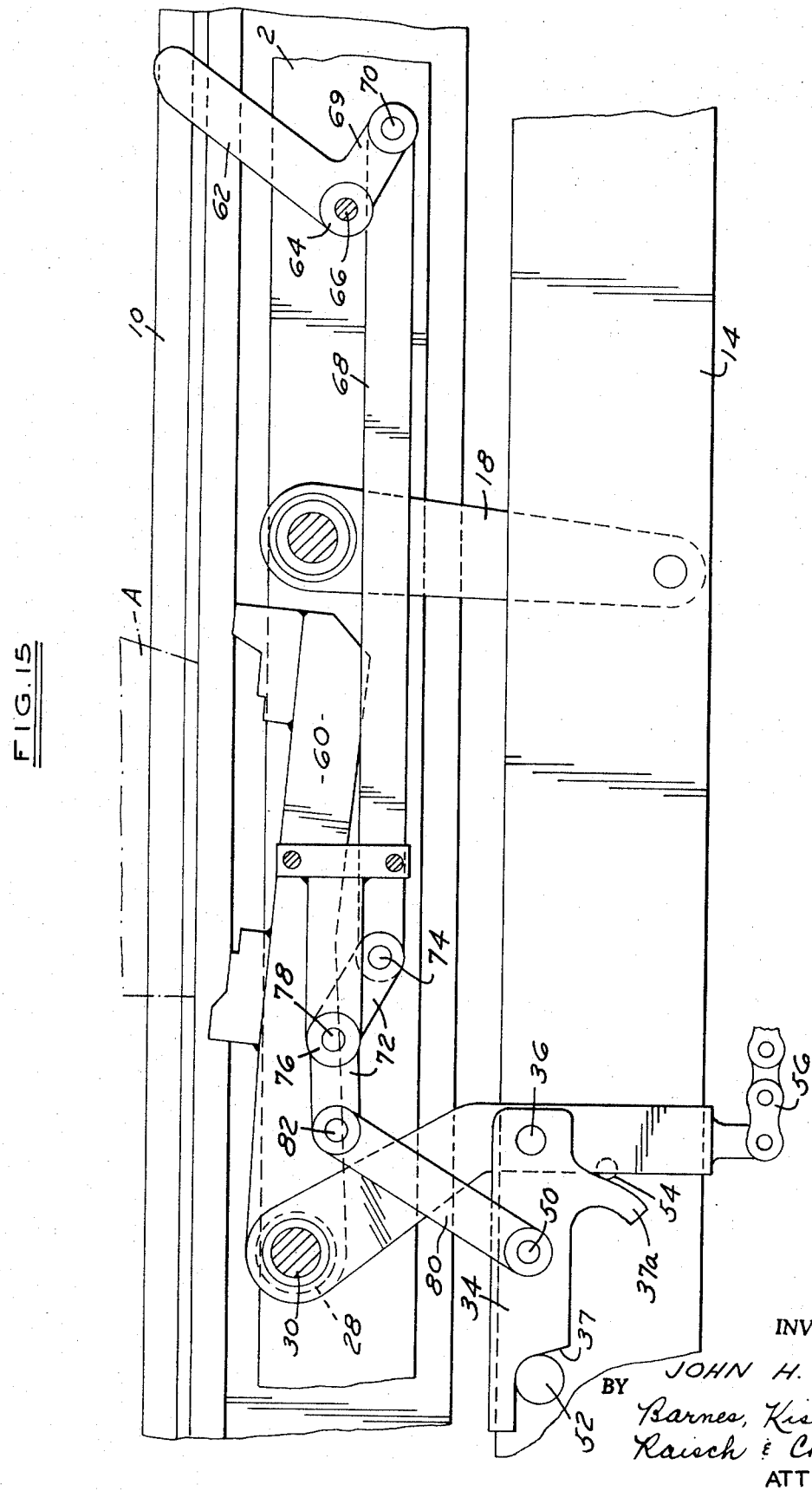

FIG. 15, a side view of lifter mechanism in the phase when station ahead unoccupied at engagement point.

Figure 16:
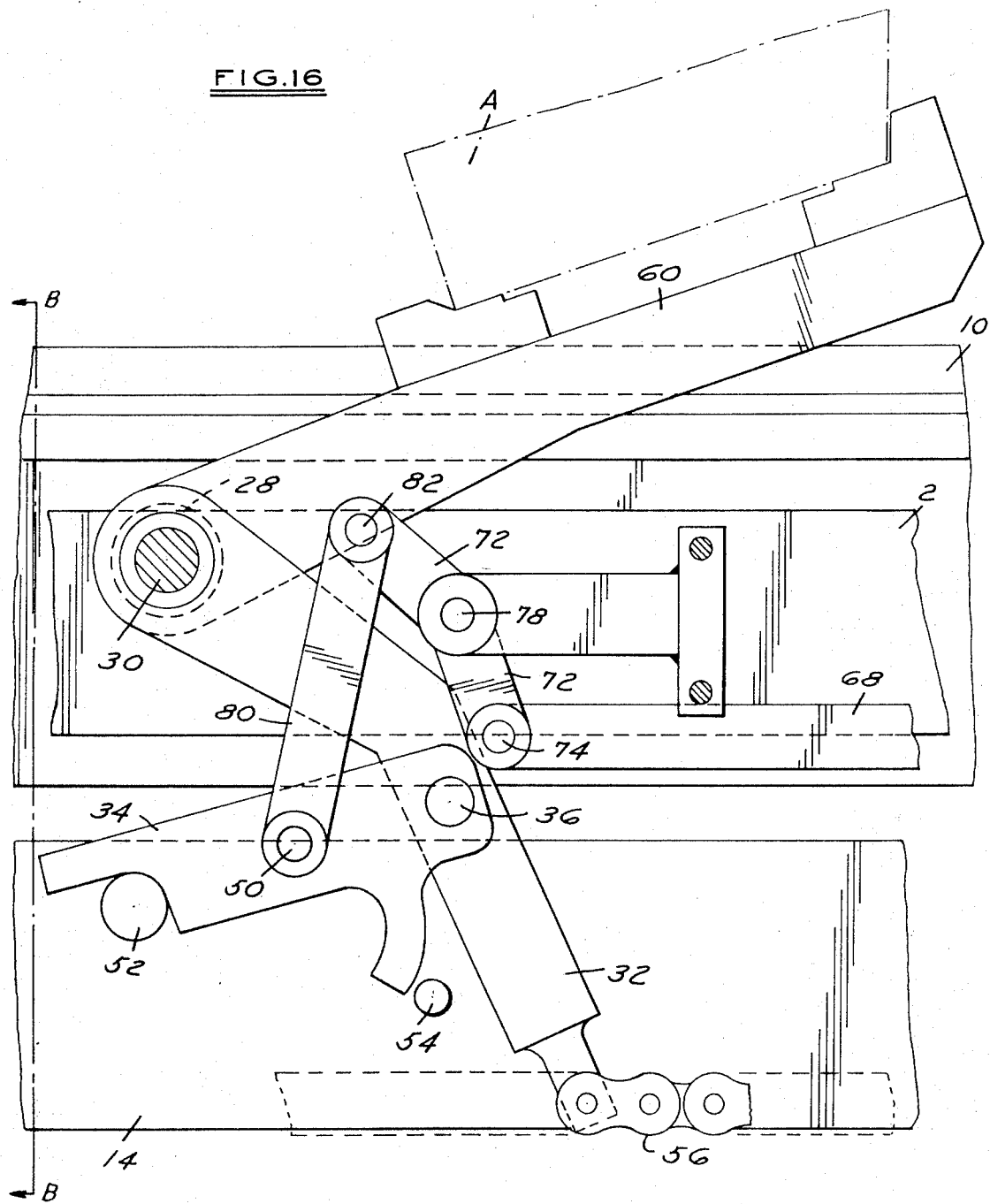

FIG. 16, a side view of mechanism with lifter arms attached to pusher dogs, at end of power bar movement, station occupied, one or more downstream stations empty.

Figure 17:
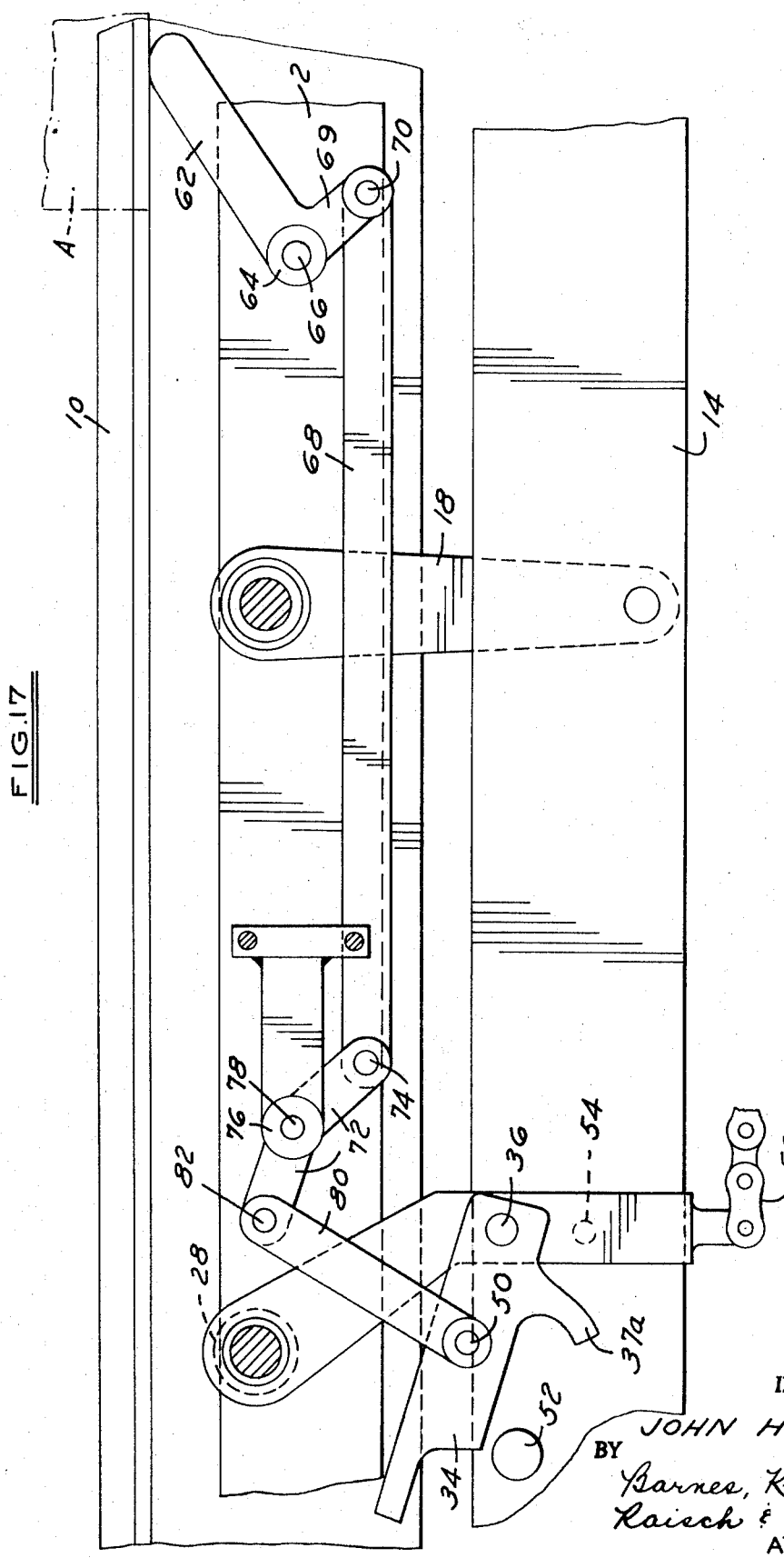

FIG. 17, a side view of probe mechanism for lift mode transfer, station ahead occupied.

Figure 18:
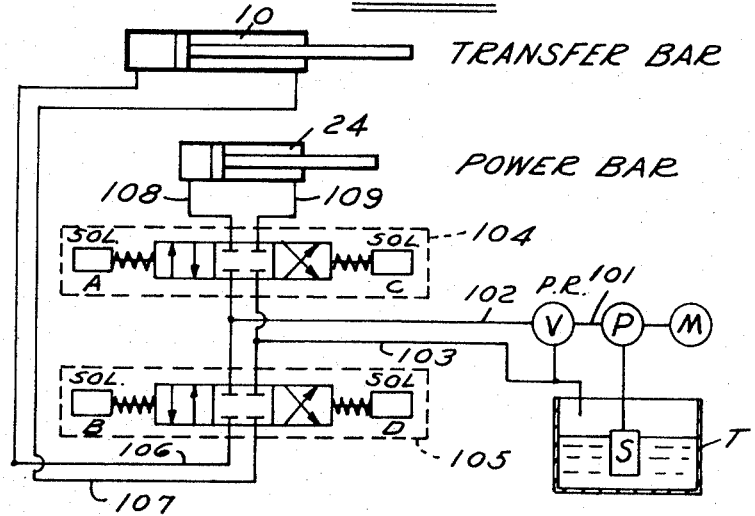

FIG. 18, a diagrammatic view of a power circuit for said transfer means.

Figure 19:
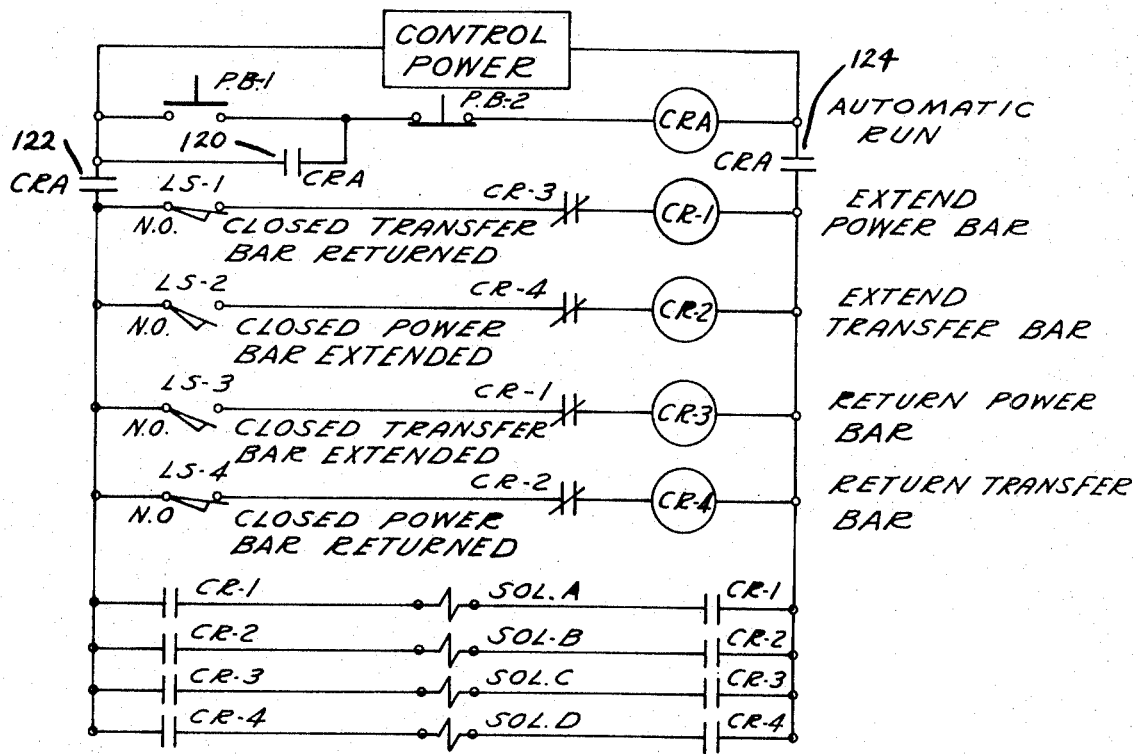

FIG. 19, a diagrammatic view of an electrical control system to combine with the hydraulic system.

REFERRING TO THE DRAWINGS:

In FIGS. 1 to 4, a first transfer means consisting of transfer bars 2 disposed in the direction of the path of movement of workpieces and spacers 4 is supported in rollers 6 and 8 which are mounted in a suitable frame assembly 10. These transfer bars 2 are reciprocated through a stroke slightly in excess of the pitch spacing between stations by a suitable driving means such as a hydraulic or air cylinder 12 (FIG. 5).

A second transfer means comprises a power bar assembly consisting of power bars 14 and spacers 16 is movably connected to the transfer bars 2 through two or more links 18 which pivot on pins 20 connected to transfer bars 2 and pins 22 on power bars 14. The power bars 14 are reciprocated through a small longitudinal stroke in the direction of the work path relative to the tranfer bars 2 by an air or hydrualic cylinder 24, FIG. 5. It will be understood that the movement of the power bars 14 will always indicate movement backward or forward relative to the transfer bars 2 rather than absolute movement.

A pusher dog or dogs 26 is supported from a torque tube 28 which is free to rotate on a spacer shaft 30 mounted between transfer bars 2. An actuator 32 is also mounted on torque tube 28 and therefore any movement of the actuator 32 about shaft 30 results in a corresponding angular movement of the pusher dogs 26. Thus, the pusher dog and the actuator become an L-shaped member, pivoted at the corner of the L.

A coupler 34 is attached at one end to the actuator 32 through pin 36, about which it is free to pivot. The coupler 34 has at its digital end a corner notch forming a drive shoulder 37, and intermediate the ends is a depending finger 37a having a curved back surface to serve as a cam. The function of the shoulder and the finger will be referred to below.

A probe 38 is connected to tranfer bar 2 through a boss 40 and pin 42. A stop screw 44, mounted in the same boss 40, is used as an adjustable down stop for pusher dog 26. Ah extension leg 41 of the probe 38, which is an L-shaped member, is connected to link 46 through pin 48; the other end of link 46 is connected to the coupler 34 through pin 50 at a point spaced from the pivot mount 36. It will be understood that the mechanism described above carrying reference characters 26-50 is repeated in every work station along the length of the transfer bar from the initial loading station downstream to the discharge station. Furthermore, at every such station along the power bar are mounted two fixed pins, a power pin 52 and a retract pin 54. The lower ends of all actuators are connected together with a flexible concatenate or rope-like member such as chain 56. The upstream end of the chain 56 is attached to a bracket 58 mounted on the power bar 14. The chain 56 is such that it will transmit tensile forces only.

At the beginning of the cycle, both power cylinders 12 and 24 (FIG. 5) are retracted. The power bar retracted (relative to the transfer bar) causes all actuators 32 and pusher dogs 26 to be retracted through the tensile capacity in the chain 56. Furthermore, when the power bar is fully retracted the retract pins 54 engage the fingers 37a of couplers 34 and raise the couplers to the lifted position shown in FIGS. 1 and 6. The couplers 34 in their lifted position cause the probes 38 to be in their retracted position through the action of the link 46 and leg 41.

An index cycle consists of four basic movements:
1. The power bar 14 moves forward relative to the transfer bar 2.
2. The transfer bar 2 moves forward through an index stroke carrying the power bar 14 with it (in its forward position relative to the tranfer bar 2).
3. The power bar 14 retracts relative to the transfer bar 2.
4. The transfer bar 2 retracts through its index stroke, carrying the power bar 14 with it (in its retracted position relative to the transfer bar 2).

During the forward movement of the power bar 14, a station mechanism can encounter a combination of circumstances. These will be individually described.

A. Workpiece in station — all other downstream stations occupied.

As the power bar 14 moves forward by action of cylinder 24, the retract pin 54 moves forward with it, thus lowering the cam surface of finger 37a. This permits the coupler 34 to rotate counterclockwise about pin 36 and causes the probe 38 to rotate counterclockwise about pin 42 through link 46 and pins 48 and 50. It will be understood that the weight of the coupler 34, probe 38, and link 50 will be adjusted, such that, in the absence of external restraints, the probe 38 will tend to rotate counterclockwise about pin 42, and the coupler 34 will also tend to rotate counterclockwise about pin 36. It will be further understood that the weight of the pusher dogs 26, torque tube 28 and actuator 32 are such that in the absence of external restraints, the assembly will tend to rotate clockwise about shaft 30 until pusher dog 26 rests against stop screw 44. After a short movement of the power bar, the probe 38 contacts the part which inhibits further motion. The coupler 34 also stops as shown in FIG. 7.

Further forward motion of the power bar 14 causes the retract pin 54 to move away from the coupler 34. As the power bar nears the end of its forward stroke, the power pin 52 contacts the bottom surface of coupler 34 as shown in FIGS. 8 and 9, causing it to rotate slightly in the clockwise direction about pin 36; this, in turn, causes the probe 38 to rotate slightly in the clockwise direction about pin 42 through link 46 and pins 48 and 50, moving the probe 38 out of contact with the workpiece. This completes the action of the mechanism during the forward motion of the power bar 14 relative to the transfer bar 2. It will be noted that the pusher dog 26 does not rise and that the probe only momentarily contacts the part and then retracts again.

B. Station empty — all other downstream stations occupied.

As the power bar 14 moves forward, the retract pin 54 movs forward with it; this again permits the coupler 34 to rotate counterclockwise about pin 36 while the probe 38 rotates counterclockwise about pin 42, through link 46 and pins 48 and 50. Since the probe encounters no part (FIG. 9), its movement is not limited, and continued forward movement of the power bar 14 and retract pin 54 permits the coupler 34 to rotate counterclockwise until it contacts power pin 54. The probe moves through the space normally occupied by a workpiece. This action normally takes place during the initial one-third stroke of the power bar 14 relative to the transfer bar 2.

As the power bar 14 continues forward, the power pin 52 contacts the drive shoulder 37 of the coupler 34, causing it to move forward; this, in turn, drives the actuator 32 forward through pin 36, causing the torque tube 28 to rotate counterclockwise on shaft 30, llifting the pusher dogs 26 upward toward their feed position (FIG. 10). This action continues until the power bar 14 reaches its full forward position, at which point, the pusher dogs have reached their feed position, FIG. 11. However, the forward movement of the coupler 34 trapped between pins 36 and 52 causes the link 46, acting through pins 48 and 50, to rotate the probe 38 clockwise about pin 42 until, with the power bar 14 full forward, the probe 38 has again retracted below the pass line of the workpieces as shown in FIG. 11.

It will be noted that the absence of a workpiece causes the pusher dogs 26 to lift, and after the probe 38 has detected the absence of a workpiece, it again retracts.

The forward movement of the actuator 32 causes all actuators 32 which are upstream of this actuator 32 to move forward in concert with it due to the tensile capacity of the interconnecting chain 56 (see FIGS. 12 and 13). However, this interconnecting chain 56 will transmit no compressive loads to any downstream actuators 32, which, therefore, remain stationary, while a single catenary loop forms in the chain 56 between the operating actuator 32 and the next downstream actuator 32.

It will be seen, therefore, that the pusher dogs 26 will raise in the most downstream vacant station, causing all upstream or following pusher dogs 26 to rise also, while all downstream pusher dogs 26 remain down. It will also be seen that all dogs are lifted under power with the capacity of the actuating cylinder 24.

C. Workpiece in station — one or more downstream stations empty.

The sequence in this situation proceeds exactly the same as in situation A, until probe 38 contacts the workpiece, stopping the counterclockwise motion of the coupler 34 about pin 36. Shortly thereafter, one or more downstream stations, indicating an absence of workpiece, cause the chain 56 to move forward, moving actuator 32 forward, FIGS. 12 and 13. Pin 36 and coupler 34 move forward, which allows coupler 34 to rotate counterclockwise about pin 36, even though probe 38 is in stationary contact with the workpiece. At the end of the forward stroke of the power bar 14, the coupler 34 falls into either full or partial engagement with power pin 54, depending on the dimensional stack-ups between stations. (This is of no consequence because the pusher dogs 26 have been positively lifted by the chain 56.) If the coupler 34 has dropped into full engagement with power pin 52, the probe 38 is retracted to its normal retracted position. If the coupler 34 has not dropped into full engagement with power pin 52, the probe 38 is retracted below its normal retracted position as previously described by contact of pin 52 with the bottom of coupler 34. This is an importnat motion since it insures only momentary contact with the workpiece and moves the probe out of the path of an incoming workpiece at any one station.

D. Station empty — one or more downstream stations empty.

The sequence for this situation is exactly the same as sequence B insofar as the station mechanism is concerned. The single difference is that no catenary loop is formed in the chain 56 ahead of such a station. The catenary loop in the chain 56 is formed only between two stations along the line and that is between the most downstream empty station and the next downstream station.

It will be noted that the mechanical determination of which pusher dogs 26 to raise and which pusher dogs 26 to allow retracted was made during the first movement of the cycle when the power bar 14 moves forward with respect to the transfer bar 2.

During the second movement of the cycle, the transfer bar 2 and power bar 14 move forward without relative movement. This movement is powered by a forward stroke of power cylinder 12. This moves those workpieces forward one station whose associated pusher dogs 26 have been raised during the first movement of the cycle, and does not move those workpieces whose pusher dogs 26 have not been raised. This means that all workpieces upstream of the most downstream gap are moved downstream one station during this forward motion of the transfer bar 2.

At the completion of the forward movement of the transfer bar 2, the power bar 14 retracts relative to the power bar 2 by reverse motion of power cylinder 24. As this occurs, any couplers 34 which had been actuated by their associated power pins 52 are permitted to return through the gravitational tendency of the actuators 32 to turn clockwise on shafts 30. However, at near midpoint durng the return of the power bar 14, the retract pins 54 contact the couplers 34, positively returning them to their most clockwise or returned position. Furthermore, the chain 56 which is attached to the power bar 14 at its most upstream end positively returns all actutors 32 to their most clockwise position as the power bar 14 reaches the end of its retract stroke. Therefore, the retraction of the power bar 14 positively retracts all actuators 32, pusher dog 26, coupler 34 and probes 38 to the position shown in FIGS. 1 and 6.

The fourth and final step of an overall cycle is the retraction of the transfer bar 2 while the power bar 14 remains retracted relative to it. Obviously, the workpieces are unaffected during this movement since the pusher dogs 26 and probes 38 are held positively retracted. When the transfer bar 2 reaches the end of its return stroke by a reverse stroke of double acting piston-cylinder 12, the cycle is completed and the mechanism is ready for the start of the next cycle which begins with the advance of the power bar 14.

It will be noted that the control system for any one station is not interconnected with the control system of any other station. Further, it will be noted that the movement of the pusher dogs 26 in either direction is positively driven by the action of the power bar 14 through pin 52 and coupler 34 or through chain 56 in the up direction and through retract pins and chain 56 in the down direction.

Since the pusher dogs 26 are lifted through the positive action of the power bar 14, it becomes simple to arrange the system to lift the workpieces from station to station, rather than to slide them as described above. This is accomplished by attaching lifter arms 60 with suitable work-engaging fixtures to the pusher dogs 26 as shown in FIG. 14. The operation of the mechanism is the same as with the slide mode, with one minor exception, as described below.

In the slide mode, the most downstream gap (unoccupied station) causes the pusehr dogs 26 to lift in that station (and in all upstream stations). These lead pusher dogs 26, therefore, move in their up position through this empty station. This creates no problem since no interferences are encountered. However, if lifter arms 60 are fitted to the pusher dogs, these lifter arms 60 would interfere with the workpiece in the next downstream station during the forward stroke of the tranfer bar 2. This situation is rectified by controlling the coupler in any one station through a probe which detects the absence or presence of a workpiece in the next downstream station. In all other respects, the operation of the mechanism remains exactly the same.

A typical mechanism to accomplish this "station ahead" control is shown in FIG. 14. An L-shaped probe 62 is pivotally connected thorugh a boss 64 and a shaft 66 to the transfer bar 2. A link 68 is connected to the short leg 69 of the probe 62 through pin 70 at one end, and at the other end, the link 68 is connected to a bellcrank 72 through a pin 74. One arm of the bell crank 72 is pivotally connected to transfer bar 2 by a boss 76 and shaft 78. The other arm of the bellcrank 72 is connected by link 80 and pins 82 and 50 to coupler 34. It can be seen that the transfer bar 2, probe 62, link 68 and bellcrank 72 constitute a simple parallelogram linkage whose purpose it is to transfer the probe angular movement about shaft 66 to an equal angular movement of the bellcrank 72 about shaft 78. Link 80 is identical with link 46 in the pusher system. The mechanism, therefore, transfers control of any given coupler one station further downstream. A lifter will raise in a given station in response to an empty station one station further downstream. In all other respects, the operation and sequence of the mechanism is identical with that described for the pusher dog system.

In FIG. 14, the ports are shown in the start position comparable to FIGS. 1 and 6 of the previous embodiment. In FIG. 15, the power transfer bar 14 has started its movement and probe 62 has raised, as retract pin 54 moves away, to explore its particular work station ahead of workpiece A. Absence of a workpiece ahead or downstream of workpiece A allows the coupler bar 34 (FIG. 16) to move into drive position and actuator bar 32 is shifted carrying with it the work lifter arm 60. The remainder of the cycle will be as above described, the workpiece A being deposited at the next station upon completion of the motion of transfer bar 2 and return to rest position of the actuator bars 32. FIG. 17 simply shows an example of a workpiece being contacted by probe 62 wherein the coupler bar will not fall into a drive position.

It will be appreciated that a combination of the pusher stations, illustrated in FIGS. 1 through 13, and the lift, carry and deposit stations, illustrated in FIGS. 14 to 17, will be used to allow greatest versatility in the system. A section as shown in FIG. 11, for example, is joined with a similar section as shown in FIG. 16 on line B—B to accomplish the composite function. In some cases, a workpiece might then be positioned in varying orientations or angles of presentation at respective work stations to make available various portions for machining, drilling, or other metal removal or finishing operations.

In the specification and claims, the term "pusher means" may include a pusher dog 26 as shown in FIGS. 1 to 13 or a lift, carry, and deposit member 60 as illustrated in FIGS. 14 to 17.

As a matter of mechanical convenience, the bellcrank 72 in a given station may be mounted on the same shaft 78 as the probe 62 for the next upstream station. Notwithstanding this arrangement, it will be noted that the control of any given coupler 34 is not related to or interconnected with the control of any other coupler 34, i.e., the control mechanism associated with the lifter 60 for any given station is independent in operation from the control mechanism of any other station, even though the aforesaid control mechanism determines the position of its coupler 34, based on the presence or absence of a workpiece in the next station.

Each lifter mechanism, therefore, makes its own "decision" based on its own control system, consisting of its associated probe 62 and coupler 34 through links 68 and 80 and bellcrank 72. The control system decides whether a given lifter should "couple" to the power system. However, when any given lifter 60 is riased by virtue of its control system, such a lifter will caue all upstream or following lifters 60 to move in concert with it by virtue of the interconnecting chain 56, and independent of the control decisions made by the control systems of such upstream lifters.

Since the transfer system described above is inherently capable of moving workpieces from station to station by sliding them on stationary rails and moving them through pusher dogs 26 or by lifting them from station to station through lifter arms 60 which carry the workpiece from station to station, it is possible to alternate the mode of transfer as desired on a given transfer system.

The mechanism described above is the preferred embodiment of the principles employed. It will be understood that the linkages utilized may be modified as individual geometrical requirements may suggest. The mechanical arrangements may also be altered to suit specific needs such as, by way of example, the use of a single transfer bar or power bar when narrow workpieces are being transferred. Similarly, the chain 56 may be replaced by a strong, flexible cable, or a series of links having elongated holes at one or both ends, or any similar arrangement which is capable of transmitting tensile loads, but incapable of tansmitting compressive loads.

A typical hydraulic system capable of operating the first and second transfer bar drive cylinders 10 and 24 is shown in FIG. 18. A typical electrical control system capable of sequencng the solenoid valves to generate the required transfer bar motion is shown in FIG. 19.

Referring to FIG. 18, a hydraulic pump P, mounted on a tank T, is driven by an electric motor M. The pump P draws oil from the tank T and delivers it through line 101 to pressure relief valve PR and thence to pressure line 102. Any oil dumped by the pressure relief valve PR (in maintaining the regulated pressure in pressure line 102) is returned to the tank thorugh tank line 103.

The oil in the pressure line 102 is carried to the two solenoid valves 104 and 105. Each of these solenoid valves 104 and 105 is a three-position valve, commercially available and of conventional design, which is held in its center position by internal springs and in which position all lines are blocked.

Referring to solenoid valve 105, it will be understood that when solenoid B is electrically energized, the valve spool shifts in a direction away from the solenoid B. The valve spool in this position directs oil from the pressure line 102 to the cylinder line 106 which causes the piston in the first transfer bar cylinder 10 to extend, advancing the first transfer bar 2; the return oil from the cylinder 10 flows through line 107, through solenoid valve 105, to tank line 103 and thence into tank T.

Conversely when solenoid D is energized, the spool shifts away from the solenoid D, directing the oil from pressure line 102 to cylinder line 107, retracting the piston in cylinder 10 returnng the transfer bar 2.

By a similar operation relative to solenoid valve 104, when solenoid A is energized, the piston in the second transfer bar (power bar) cylinder 24 extends, advancing the second transfer bar (power bar) 14 relatively to the first transfer bar 2; and, conversely, when solenoid C is energized, the power bar cylinder 24 retracts, returning the second transfer bar (power bar) 14 relative to the first transfer bar.

Referring to FIG. 19, the electrical circuit shown is energized by operating PB-1 which energizes the automatic sequence relay, CRA. One set of CRA contacts 120 locks in around PB-1, keeping CRA energized until a momentary operation of PB-2 de-energizes CRA.

The other two contacts 122, 124 of CRA supply control power to the sequencing relays CR-1, CR-2, CR-3 and CR-4, and the hydraulic solenoid valves. The position of the limit switches as shown in FIG. 19 is at the defined starting point of a cycle with the second transfer bar (power bar) 14 and the first transfer bar 2 both in their returned or retracted positions.

When power is supplied to the circuit, relay CR-1 is energized through limit switch LS-1 which is held closed by the transfer bar 2 being returned. CR-1 energizes solenoid A which shifts solenoid valve 104 in a direction to cause the power bar 14 to move forward relative to the transfer bar 2.

When the power bar 14 reaches its full forward position, LS-2 is closed, energizing CR-2 and solenoid B which shifts solenoid valve 105 in a direction to cause the transfer bar 2 to move forward. As the transfer bar starts to move forward, LS-1 opens, de-energizing CR-1 and solenoid A, permitting solenoid valve 104 to be centered, blocking all ports and locking the power bar cylinder 24 in its extended position.

When the transfer bar reaches its full forward position, LS-3 is closed, energizing CR-3 and solenoid C which shifts solenoid valve 104 in a direction to return the power bar 14. As the power bar 14 starts its return stroke, LS-2 reopens, de-energizing CR-2 and solenoid B permitting solenid valve 105 to be centered blocking all ports and locking the transfer bar 2 in its forward position.

When the power bar 14 reaches its full returned position, LS-4 is closed, energizing CR-4 and solenoid D which shifts solenoid valve 105 in a direction to return transfer bar 2. As the transfer bar 2 starts its return stroke, LS-3 reopens, deenergizing CR-3 and solenoid C, permitting solenoid valve 104 to be centered blocking all ports and locking the power bar 14 in its retracted position.

When the transfer bar 2 reaches its full returned position, LS-1 is reclosed, re-energizing CR-1 and solenoid A which again shifts the solenoid valve 104 in a direction to re-extend the power bar 14. As the power bar 14 starts its forward stroke, LS-4 re-opens, de-energizing CR-4 and solenoid D, permitting solenoid valve 105 to be centered, blocking all ports and locking the transfer bar 2 in its returned position.

It can be seen that this movement pattern will be repeated endlessly as long as CRA remains energized. The speed of operation is determined by the relative volumetric capacities of the pump P and the hydraulic cylinders 10 and 24.

It will be understood that the aforesaid electrical control system is shown in its most simple form and lacks many desirable refinements such as manual step-by-step sequencing, variable speed controls, and external interlocks. These have been omitted to present the minimum necessary hydraulic and electrical control systems. It will also be understood that the actual switches and actuators on the transfer bars 2 and 14 have been omitted to simplify the presentation.

It will be appreciated that a fully hydraulic control system may be employed by substituting mechanical shift valves for the limit switches and control relays. Indeed, any one of the conventional control systems may be employed according to individual requirements or preferences.

I claim:

1. In an accumulating feed system comprising a series of work stations including a starting station at which workpieces are deposited, a delivery station downstream from said starting station from which workpieces are removed sequentially, and a plurality of intermediate stations through which workpieces are advanced intermittently and to which workpieces may be delivered and from which workpieces may be removed, and a transfer and sensing means for moving workpieces in a work advnace path between said starting station and said delivery station, the combination comprising:

a. support means for supporting workpieces as they are resting at work stations,
 b. a first transfer means comprising an elongate first member extending along said work stations and mounted for two-way movement relative to said support means in the direction of and opposite to said workpiece movement,
 c. a second transfer means comprising an elongate member extending adjacent and in the same direction as said first member and mounted for two-way movement relative to said first member in the direction of and opposite to the movement of said workpieces and for movement with said first member relatie to said support means during movement of said first transfer means in the direction of movement of the workpieces,
 d. power means for moving said first and second transfer means relative to said support means and relato each other and means operatively connecting the first and second transfer means such that movement of the first transfer means produces a corresponding movement of the second transfer means,
 e. a plurality of pusher means, one for each work station, for said workpieces mounted to move with said first transfer means and movable from an idle position out of the path of said workpieces to a workpiece engaging position,
 f. control means at each station for each of said pusher means, including sensor means for detecting the presence or absence of a workpiece at said station, said control means being responsive to relative movement between said first and second transfer means and the absence of a workpiece at one or more stations to move selective pusher means individually from said idle position to said workpiece engaging position, and
 g. means extending between and connected directly to each said pusher means wherein movement of any one of said pusher means at one station from idle to workpiece engaging position acts through said direct connections to cause all said pusher means at stations upstream from said one pusher means, independently of the actuation or nonactuation of the control means at the upstream stations, to be moved simultaneously to a work position without affecting said pusher means at stations downstream from said one pusher means.

2. An accumulating feed system as defined in claim 1 in which said pusher means, said control means, and said means extending between said pusher means are supported entirely on said first transfer means independent of said support means for workpieces.

3. An accumulating feed system as defined in claim 1 in which said transfer means comprises one or more elongate bars extending adjacent said work stations, said second transfer means being reciprocally supported on said first transfer means.

4. An accumulating feed system as defined in claim 1 in which said power means comprises a means for imparting motion to said transfer means in a sequence wherein said second transfer means moves in the direction of the work advance path relative to said first transfer means, said first and second transfer means move together in the work advance path, said second transfer means moves in the direction opposite to said work advance path, and fianlly said first and second transfer means each move in the direction opposite said work advance path.

5. An accumulating feed system as defined in claim 1 in which said pusher means comprises a lever having angularly related legs pivoted at the junction of the legs on said first transfer means, having one leg to move adjacent said first transfer means to contact a workpiece and a second leg to serve as an actuator bar, said second leg being connected to said means extending between and connected to said pusher means.

6. An accumulating feed system as defined in claim 1 in which said control means comprises a sensor arm mounted wherein a portion of said arm is movable into and out of the work advance path, and link means operably associated with said pusher means and said second transfer means to move said portion of said sensor arm to a work sensing position toward said work advance path each time said second transfer means moves relative to said first transfer means in the direction of the work advance path.

7. An accumulating feed system as defined in claim 1 in which said control means comprises a sensor dog pivoted on said first transfer means and link means operably associated with said pusher means and said second transfer means to move said dog periodically to a work sensing position as said second transfer means moves relative to said first transfer means in the direction of the work advance path.

8. An accumulating feed system as defined in claim 5 in which said control means comprises a sensor dog pivoted on said first transfer means and link means operably associating said sensor dog and said actuator bar of said pusher means.

9. An accumulating feed system as defined in claim 8 in which abutments are mounted on said second transfer means to contact said link means and movable with said second transfer means to effect shifting of said sensor dog to a work sensing position as said second transfer means moves relative to said first transfer means in the direction of the work advance path.

10. An accumulating feed system as defined in claim 7 in which said sensor dog comprises a lever pivoted intermediate its ends on said first transfer means and having a sensor leg movable into the workpiece path and a second leg, a link pivoted to said second leg, a coupler element pivoted at one point to said link, and pivoted at a second point to one of said pusher means, and means on said second transfer means to effect shifting of said coupler element, link, and sensor dog in response to relative motion between said first and second transfer means.

11. An accumulating feed system as defined in claim 5 in which said control means comprises a lever pivoted intermediate its ends on said first transfer means and having a sensor leg movable into the workpiece path, and a sedond leg, a link pivoted to said second leg, a coupler element, means pivoting said link to said coupler element at one point, means pivoting said coupler element at a second point to said actuator bar of said pusher means wherein said coupler element is movable into a drive position, and means on said second transfer means to contact and effect shifting of said coupler element in response to relative motion between said first and second transfer means.

12. An accumulating feed system as defined in claim 11 in which said means on said second transfer means comprises an abutment to contact a portion to said coupler element to effect shifting of said link and sensor dog to and from a sensing position at the work path.

13. An accumulating feed system as defined in claim 11 in which means is provided on said second transfer means to contact said coupler element when in a drive position to drive said actuator bar to tension said means, extending between and connected to each said pusher means and actuate upstream pusher means to a work position.

14. An accumulating feed system as defined in claim 10 in which said coupler element has a first portion spaced longitudinally of the coupler element away from the second pivot point formed to provide a drive shoulder when in drive position and a second portion adjacent the second pivot point spaced transversely of a line connecting said first and second pivot points, and said means on said second transfer means to shift said coupler element, link, and sensor dog comprises a first abutment to contact said second portion to effect movement of said coupler element in a pivotal motion to and from a drive position, and a second abutment to contact said first portion when said coupler is in said drive position to move said coupler element and said pusher means to a work drive position.

15. An accumulating feed system as defined in claim 11 in which said coupler element has a first portion spaced longitudinally of the coupler element away from the first point of pivot formed to provide a drive shoulder and a second portion adjacent the second pivot point spaced transversely of a line connecting said first and second points, and said means on said second transfer means to shift said coupler element, link, and sensor dog comprises a first abutment to contact said second portion to effect movement of said coupler element in a pviotal motion to and from a drive position, and a second abutment to contact said first portion when said coupler is in a drive position to move said coupler element and the associated acutator bar to a work drive position and to tension said means extending between and connected to each said pusher means and simultaneously actuate all actuator bars at stations upstream of said one bar independently of the control means at said upstream stations.

16. An accumulating feed system as defined in claim 1 in which said pusher means comprises an L-shaped member having an abutment surface to contact and push a workpiece along said support means.

17. An accumulating feed system as defined in claim 1 in which said pusher means comprises means for engaging, and lifting and supporting a workpiece as the pusher means moves to a work position in the path of the workpiece.

18. An accumulating feed system as defined in claim 1 in which said pusher means comprises an L-shaped member having a portion for engaging, lifting and supporting a workpiece as the pusher means moves to a work position in the path of the workpieces.

19. In an accumulating feed system comprising a series of work stations including a starting station at which workpieces are deposited, a delivery station downstream from said starting station from which workpieces are removed sequentially, and a plurality of intermediate stations through which workpieces are advanced intermittently and to which workpieces may be delivered and from which workpieces may be removed, and a transfer and sensing means for moving workpieces in a work advance path between said starting station and said delivery station, the combination comprising:
 a. support means for supporting workpieces as they are resting at respective work stations,
 b. a first transfer means comprising an elongate first member extending along said work stations and mounted for two-way movement relative to said support means in the direction of and opposite to said workpiece movement,
 c. a second transfer means comprising an elongate member extending adjacent and in the same direction as said first member and mounted for two-way movement relative to said first member in the direcaton of and opposite to the movement of said workpieces and for movement with said first member relative to said support means during movement of said first transfer means in the direction of movement of the workpieces,
 d. power means for moving said first and second transfer means relative to said support mans and relato each other and means operatively connecting the first and second transfer means such that movement of the first transfer means produces a corresponding movement of the second transfer means,
 e. a plurality of work lift and carry means, one for each work station, for said workpieces mounted on and to move with said first transfer means movable from an idle position out of the path of said workpieces to a lift and carry position in the path of said workpieces,
 f. control means for each of said lift and carry means responsive to relative movement between said first and seond transfer means to move said lift and carry means individually from said idle position to a lift and carry position, and
 g. tension means connectng all of said lift and carry means independently of said transfer means wherein movement of any one of said lift and carry means from idle to work position will cause all said lift and carry means at work stations upstream from said one pusher means to be moved simultaneously to a work position without affecting said lift and carry means at stations downstream from said one lift and carry means.

20. An accumulating feed system as defined in cliam 19 in which said lift and carry means comprises a lever pivoted intermediate its ends on said first transfer means having one leg to move adjacent said first transfer means to contact, lift, carry and lower, a workpiece, and a second leg to serve as an actuator bar, said second leg being connected to said tension means.

21. An accumulating feed system as defined in claim 19 in which said control means comprises a sensor arm mounted wherein a portion of said arm is movable in a sensing motion toward, into, and out of a work position at each work station, and link means operably associated with said lift and carry means at each station and said second transfer means to move said portion of said sensor arm periodically to a work sensing position toward a work position at a station as said second transfer means moves relative to said first transfer means in the direction of the work advance path.

22. An accumulating feed system as defined in claim 21 in which said portion of said sensor arm of any one station is poistioned to move in a sensing motion into the work position of the next adjacent work station downstream of said any one station.

23. In an accumulating feed system comprising a series of work stations including a starting station at which workpieces are deposited, a delivery station downstream from said starting station from which workpieces are removed sequentially, and a plurality of intermediate stations through which workpieces are advanced intermittently and to which workpieces may be delivered and from which workpieces may be removed, and a transfer and sensing means for moving workpieces in a work advance path between said starting station and said delivery station, the combination comprising:
 a. support means for supporting workpieces as they are resting at work stations,
 b. a first transfer means comprising an elongate first member extending along said work stations and mounted for two-way movement relative to said support means in the direction of and opposite to said workpiece movement,
 c. a second transfer means comprising an elongate member extending adjacent and in the same direction as said first member and mounted for two-way movement relative to said first member in the direction of and opposite to the movement of said workpieces and for movement with said first member relative to said support means during movement of said first transfer means in the direction of movement of the workpieces,
 d. power means for moving said first and second transfer means relative to said support means and relative to each other and means operatively connecting the first and second transfer means such that movement of the first transfer means produces a corresponding movement of the second transfer means,
 e. a plurality of work lift and carry means, one for each work station, for said workpieces mounted on and to move with said first transfer means movable from an idle position out of the path of said workpieces to a lift and carry position in the path of said workpieces,
 f. control means at each station for each of said lift and carry means, including sensor means for detecting the presence or absence of a workpiece at said station, said control means being responsive to relative movement between said first and second transfer means and the absence of a workpiece at one or more stations to move selective lift and carry means individually from said idle position to said workpiece engaging position, and g. means extending between and connected directly to each said lift and carry means wherein movement of any one of said lift and carry means at one station from idle to workpiece engaging position acts through said direct connections to cause all said lift and carry means at stations upstream from said one lift and carry means, independently of the actuation or non-actuation of the control means at the upstream stations, to be moved simultaneously to a work position without affecting said lift and carry means at stations downstream from said one lift and carry means.

24. In an accumulating feed system comprising a series of work stations including a starting station at which workpieces are deposited, a delivery station downstream from said starting station from which workpieces are removed sequentially, and a plurality of intermediate stations through which workpieces are advanced intermittently and to which workpieces may be delivered and from which workpieces may be removed, and a transfer and sensing means for moving workpieces in a work advance path between said starting station and said delivery station, the combination comprising:

a. support means for supporting workpieces as they are resting at respective work stations, b. a first transfer means comprising an elongate first member extending along said work stations and mounted for two-way movement relative to said support means in the direction of and opposite to said workpiece movement, c. a second transfer means comprising an elongate member extending adjacent and in the same direction as said first member and mounted for two-way movement relative to said first member in the direction of and opposite to the movement of said workpieces and for movement with said first member relative to said support means during movement of said first transfer means in the direction of movement of the workpieces, d. power means for moving said first and second transfer means relative to said support means and relative to each other and means operatively connecting the first and second transfer means such that movement of the first transfer means produces a corresponding movement of the second transfer means, e. a plurality of work conveying means comprising pusher means and work lift and carry means for said workpieces arranged selectively at consecutive work stations, one means at each station, each mounted on and to move with said first transfer means, each movable from an idle position out of the path of te workpieces, respectively, to a pusher position and a lift and carry position in the path of said workpieces, f. control means for each of said work conveying means responsive to relative movement between said first and second transfer means to move said pusher means and said lift and carry means individually from said idle position respectively to workpiece engaging position, and g. tension means connecting all of said work conveying means independently of said transfer means wherein movement of any one of said work conveying means from idle to work engaging position will cause all of said work conveying means at work stations upstream from said one work conveying means to be moved simultaneously to a work engaging position.

25. In an accumulating feed system comprising a series of work stations including a starting station at which workpieces are deposited, a delivery station downstream from said starting station from which workpieces are removed sequentially, and a plurality of intermediate stations through which workpieces are advanced intermittently and to which workpieces may be delivered and from which workpieces may be removed, and a transfer and sensing means for moving workpieces in a work advance path between said starting station and said delivery station, the combination comprising:

a. support means for supporting workpieces as they are resting at work stations, b. a first transfer means comprising an elongate first member extending along said work stations and mounted for two-way movement relative to said support means in the direction of and opposite to said workpiece movement, c. a second transfer means comprising an elongate member extending adjacent and in the same direction as said first member and mounted for two-way movement relative to said first member in the direction of and opposite to the movement of said workpieces and for movement with said first member relative to said support means during movement of said first member in the direction of movement of the workpieces, d. power means for moving said first and second transfer means relative to said support means and relative to each other and means operatively connecting the first and second transfer means such that movement of the first transfer means produces a corresponding movement of the second transfer means, e. a plurality of pusher means, one for each work station, for said workpieces mounted to move with said first tranfer means moveable from an idle position out of the path of said workpieces to a workpiece-engaging position, without affecting said work engaging means downstream from said one work conveying means.

f. coupler means, movably associated with each said pusher means and said second transfer means, movable from a non-coupling position in which said pusher means is not driven to its work-engaging position by said second transfer means, to a coupling position in which said second tranfer means drives said pusher means to its workpiece-engaging positon and then moves with the first transfer means to positively maintain said pusher means in its workpiece-engaging position during the work advancing stroke of said first transfer means, g. control means at each station of each of said pusher means, including sensor means for detecting the presence or absence of a workpiece at said station, said control means being responsive to the absence of a workpiece at one or more stations to move selective coupler means individually from said non-coupling position to said coupling position, and h. means extending between and connected directly to each said pusher means wherein movement of any one of said pusher means at one station from idle to workpiece-engaging position acts through said direct connections to cause all said pusher means at stations upstream from said one pusher means, independently of the actuation or nonactuation of the control means at the upstream stations, to be moved simultaneously to a work position without affecting said pusher means at stations downstream from said one pusher means.

* * * * *